US007068241B2

(12) United States Patent
Sato et al.

(10) Patent No.: US 7,068,241 B2
(45) Date of Patent: Jun. 27, 2006

(54) STEREO PICTURE RECOGNITION DEVICE AND METHOD OF DISPLAYING STEREO PICTURE

(75) Inventors: Seiji Sato, Kanagawa (JP); Akira Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 423 days.

(21) Appl. No.: 09/888,315

(22) Filed: Jun. 22, 2001

(65) Prior Publication Data

US 2002/0044350 A1 Apr. 18, 2002

(30) Foreign Application Priority Data

Jun. 21, 2000 (JP) ............................ P2000-185635
Jun. 1, 2001 (JP) ............................ P2001-166033

(51) Int. Cl.
*G09G 5/00* (2006.01)
*H04N 13/04* (2006.01)
*G02F 1/1335* (2006.01)
*G02B 27/22* (2006.01)

(52) U.S. Cl. ............................ 345/8; 348/51; 349/15; 359/466

(58) Field of Classification Search .................. 345/6; 359/465, 466; 348/57, 51; 349/15, 7–9
See application file for complete search history.

(56) References Cited

U.S. PATENT DOCUMENTS

| 4,281,341 | A | * | 7/1981 | Byatt ........................... 348/57 |
| 4,792,850 | A | * | 12/1988 | Liptoh et al. .................. 348/57 |
| 5,007,715 | A | * | 4/1991 | Verhulst ....................... 349/15 |
| 5,993,004 | A | * | 11/1999 | Moseley et al. ................ 353/8 |
| 6,115,177 | A | * | 9/2000 | Vossler ........................ 359/465 |
| 6,252,624 | B1 | * | 6/2001 | Yuasa et al. ................... 348/56 |
| 6,266,106 | B1 | * | 7/2001 | Murata et al. ................. 349/15 |
| 6,278,501 | B1 | * | 8/2001 | Lin .............................. 349/13 |
| 6,348,957 | B1 | * | 2/2002 | Yamazaki et al. ............. 349/15 |
| 6,359,664 | B1 | * | 3/2002 | Faris ........................... 349/15 |
| 6,456,432 | B1 | * | 9/2002 | Lazzaro et al. .............. 359/464 |
| 6,510,002 | B1 | * | 1/2003 | Tsang .......................... 359/465 |

* cited by examiner

*Primary Examiner*—Xiao Wu
*Assistant Examiner*—M. Fatahiyar
(74) *Attorney, Agent, or Firm*—Sonnenschein Nath & Rosenthal LLP

(57) ABSTRACT

A stereo picture recognition device has a time-sharing picture display shutter disposed between a display surface of a display device and a viewer. The time-sharing picture display shutter has a function of shutting off only an area covered by a viewing angle which corresponds to a display area of the display device.

13 Claims, 9 Drawing Sheets

LINEAR POLARIZATION FILTER METHOD
(USING OPTICAL MODULATION DEVICE)

FIG. 6

PRINCIPLE OF OPERATION OF OPTICAL MODULATION DISPLAY DEVICE

STEREO PICTURE RECOGNITION DEVICE AND METHOD OF DISPLAYING STEREO PICTURE

RELATED APPLICATION DATA

The present application claims priority to Japanese Application No. P2001-185635 filed Jun. 1, 2001, which application is incorporated herein by reference to the extent permitted by law.

BACKGROUND OF THE INVENTION

The present invention relates to a stereo picture recognition device and a method of displaying the stereo picture for recognizing, without sensing flicker, the stereo picture which is displayed by a time-sharing system.

Figure 8:
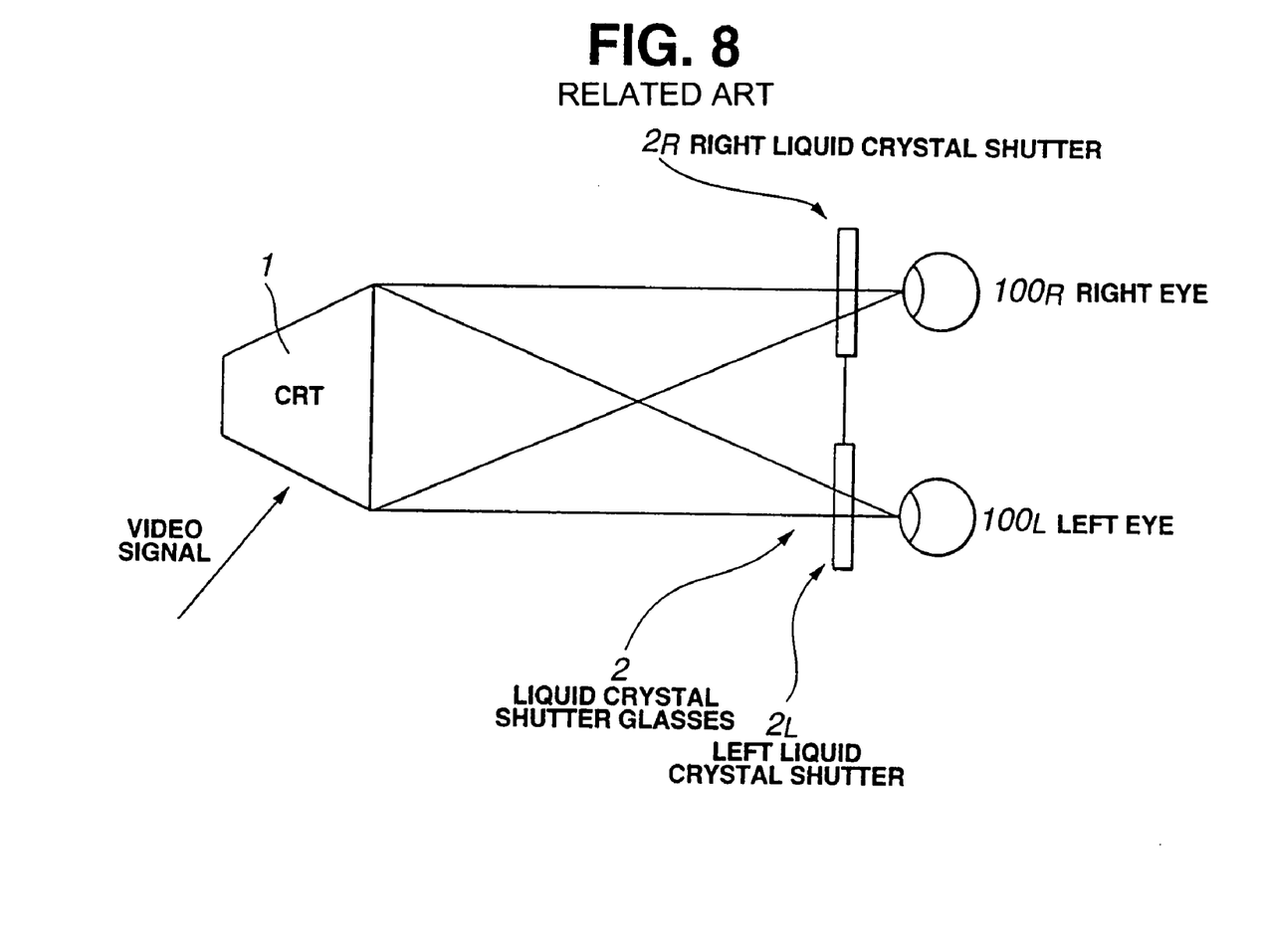
FIG. 8 is a stereo picture recognition device, according to an earlier technology.

As is seen in FIG. 8, there is provided a stereo picture recognition device (stereo picture display system) using a pair of liquid crystal shutter glasses, according to an earlier technology. In FIG. 8, there are shown a cathode ray tube 1 (hereinafter referred to as "CRT 1") used as a stereo display device, and a pair of liquid crystal shutter glasses 2. A viewer facing the CRT 1 and wearing the liquid crystal shutter glasses 2 allows a right liquid crystal shutter 2R to be disposed in front of a right eye 100R of the viewer, and a left liquid crystal shutter 2L to be disposed in front of a left eye 100L of the viewer.

Figure 9A:
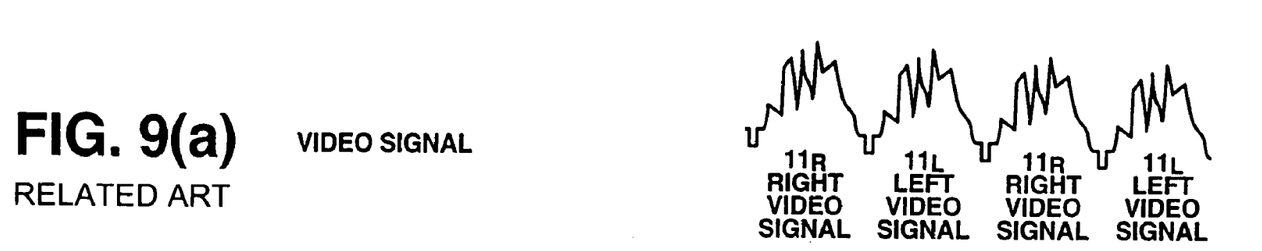
Figure 9B:
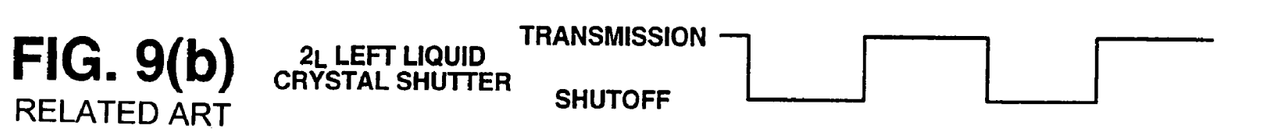
Figure 9C:
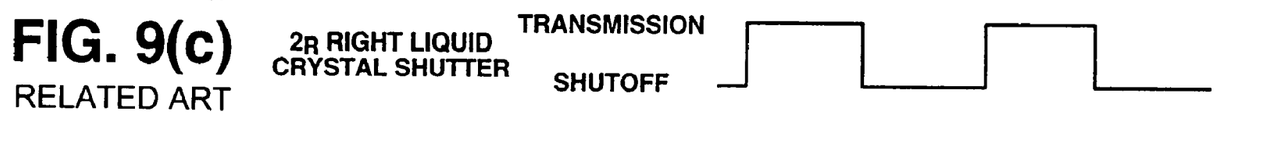

As is seen in FIG. 9(a), there is shown a period at which a right video signal 11R for the right eye 100R and a left video signal 11L for the left eye 100L are supplied. On a display surface of the CRT 1, the right video signal 11R and the left video signal 11L are alternately displayed at a vertical scanning period. Synchronously with this, as is seen in FIG. 9(b) and FIG. 9(c), switching transmission-and-shutoff operations of the right liquid crystal shutter 2R and the left liquid crystal shutter 2L leads images, respectively, to the right eye 100R and the left eye 100L. The thus led right image and left image are different from each other.

Taking into account right-and-left parallax for the thus led respective right image and left image allows the viewer to sense (feel) stereoscopic about the picture.

Figure 10:
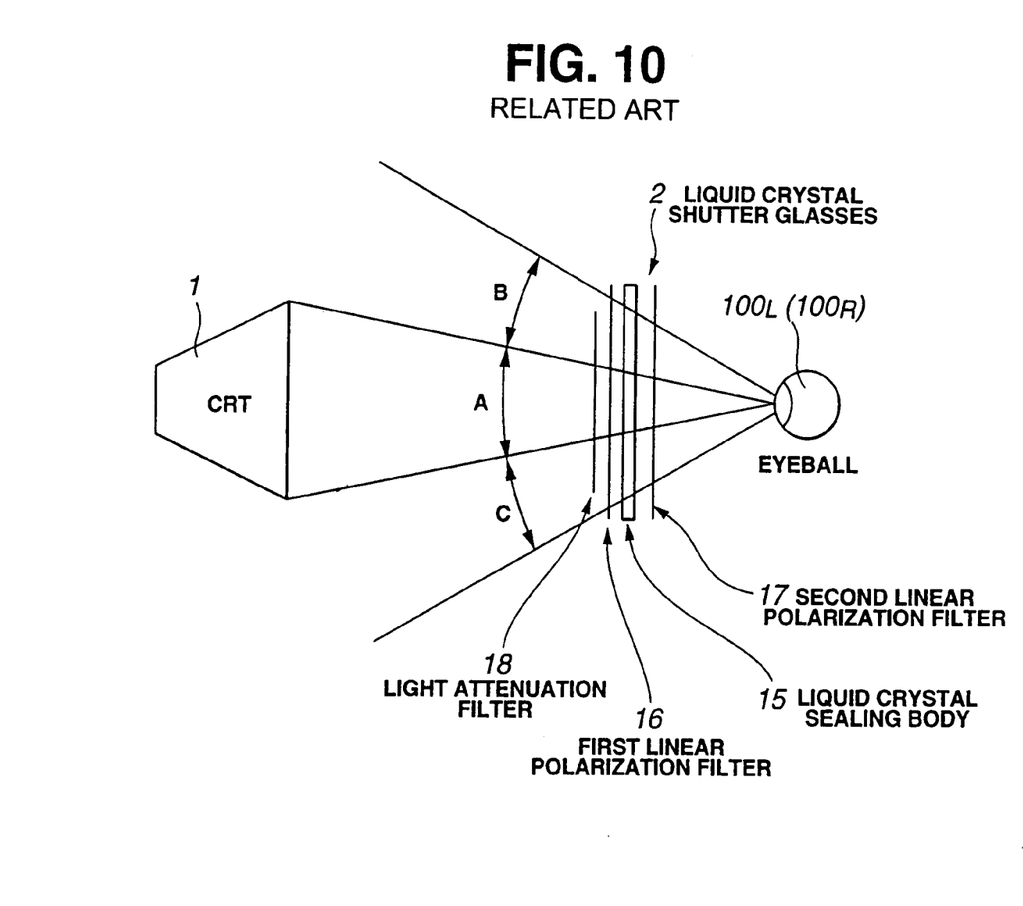
FIG. 10 is a constitution of a conventional linear polarization filter method.

As is seen in FIG. 10, the liquid crystal shutter glasses 2 are constituted of a liquid crystal sealing body 15 (glass plate), a first linear polarization filter 16, a second linear polarization filter 17, and a light attenuation filter 18. The first linear polarization filter 16 and the second linear polarization filter 17 are so disposed adjacent to the liquid crystal sealing body 15 as to put therebetween the liquid crystal sealing body 15. The light attenuation filter 18 is disposed adjacent to the first linear polarization filter 16 facing the CRT 1.

As is seen in FIG. 10, in the stereo picture display system according to the earlier technology, it is not only in an area covered by a viewing angle A that the left eye 100L (right eye 100R as well) shuts off external light at the period in FIG. 9(b) {for right eye 100R, FIG. 9(c)}, but also in an area covered by a viewing angle B and a viewing angle C. Basically, the viewing angle A is for viewing a screen (or a picture plane) of the CRT 1, while the viewing angle B and the viewing angle C are for viewing an area other than the screen of the CRT 1.

This causes the viewer to sense flicker in a surrounding landscape, especially when the external light is bright, to thereby make the viewer tired. Moreover, when frequency of light transmitting through the liquid crystal shutter glasses 2 is close to frequency of an illumination (such as a fluorescent lamp and the like), the flicker is encouraged.

As is seen in FIG. 10, surround brightness is attenuated to half or below due to the first linear polarization filter 16 of the liquid crystal shutter glasses 2. Moreover, the time-sharing system as is seen FIG. 9(a), FIG. 9(b) and FIG. 9(c) reduces viewing time by half for viewing outside. Thereby, transmission is reduced to ¼ or below, to thereby provide a poor surround visibility.

For reducing the flicker, the light attenuation filter 18 (ND filter) is added to the stereo picture recognition device in FIG. 10. This further reduces the transmission, to thereby cause a further poorer surround visibility. Such poor surround visibility is even dangerous.

SUMMARY OF THE INVENTION

It is therefore an object of the present invention to provide a stereo picture recognition device and a method of displaying the stereo picture, so that the viewer can be free from sensing any flicker even when the viewer views around the display surface.

It is another object of the present invention to provide the stereo picture recognition device and the method of displaying the stereo picture, so as to bring about improved brightness (more specifically, several times brighter than according to the earlier technology).

According to a first aspect of the present invention, there is provided a stereo picture recognition device which comprises a time-sharing picture display shutting means disposed between a display surface of a display device and a viewer. The time-sharing picture display shutting means has a function of shutting off only an area covered by a viewing angle which corresponds to a display area of the display device.

According to a second aspect of the present invention, there is provided a stereo picture recognition device which comprises a liquid crystal shutter portion for transmitting and shutting off a light which is emitted from a picture displayed on a display surface of a display device toward each of a right eye and a left eye of a viewer. The transmission and shutoff of the light is carried out substantially synchronously with a change in the picture displayed and is carried out alternately for the right eye and the left eye. The liquid crystal shutter portion comprises: a first polarization filter which is so disposed as to oppose the display surface of the display device; a pair of second polarization filters, each of which is disposed at a front portion of one of the right eye and the left eye of the viewer; and a liquid crystal sealing body disposed between the first polarization filter and the second polarization filters.

According to a third aspect of the present invention, there is provided a method of displaying a stereo picture. The method comprises: i) emitting a light from a picture toward each of a right eye and a left eye of a viewer, which picture is displayed on a display surface of a display device; ii) transmitting and shutting off the light toward each of the right eye and the left eye by means of a liquid crystal shutter portion substantially synchronously with a change in the picture displayed; and iii) leading the picture to each of the right eye and the left eye, in which the picture led to the right eye and the picture led to the left eye are different from each other. The transmission and shutoff of the light is carried out alternately for the right eye and the left eye. The liquid crystal shutter portion comprises: a first polarization filter which is so disposed as to oppose the display surface of the display device, a pair of second polarization filters, each of which is disposed at a front portion of one of the right eye and the left eye of the viewer, and a liquid crystal sealing body disposed between the first polarization filter and the second polarization filters.

The other objects and features of this invention will become understood from the following description with reference to the accompanying drawings.

BRIEF DESCRIPTION OF THE DRAWINGS

FIG. 9 shows a shutter function of a stereo picture recognition device of the earilier technology by a time-sharing system, in which FIG. 9(a) is a waveform of a video signal, FIG. 9(b) is a time chart showing transmission period and shutoff period of a left liquid crystal shutter 2L, and FIG. 9(c) is a time chart showing transmission period and shutoff period of a right liquid crystal shutter 2R.

DESCRIPTION OF THE PREFERRED EMBODIMENT

Figure 1:
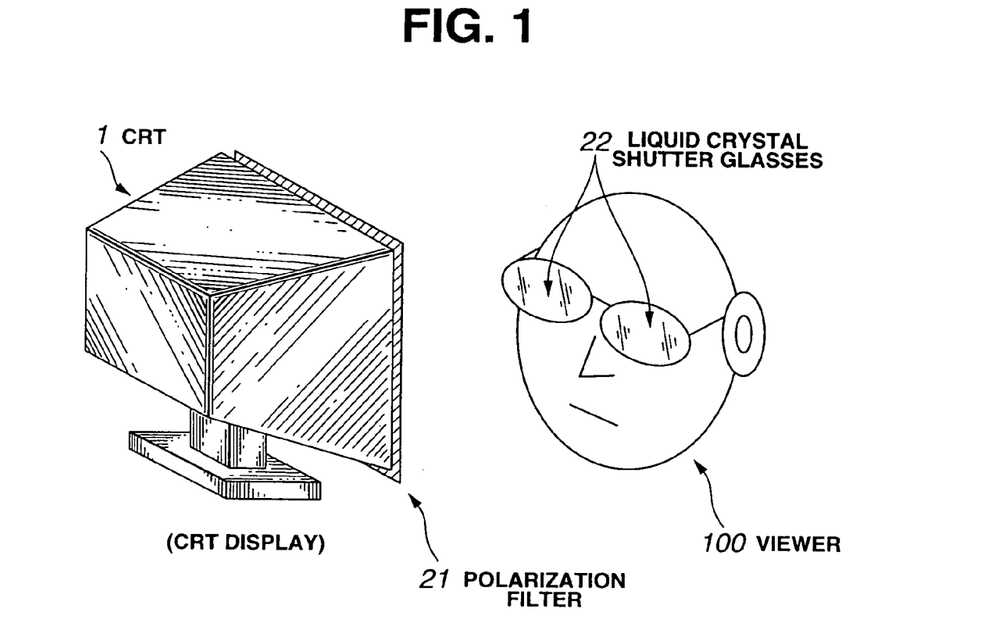
FIG. 1 is a perspective view of an essential part showing a principle of the present invention.

As is seen in FIG. 1, there is provided an overview of a stereo picture recognition device using liquid crystal shutter glasses, under the present invention.

There is provided a CRT 1 (a stereo picture display), a polarization filter 21 (polarization converting means), and a pair of liquid crystal shutter glasses 22 for viewing a screen (picture plane) of the CRT 1. The CRT 1 in FIG. 1 is substantially the same as the CRT 1 according to the earlier technology in FIG. 8. The liquid crystal shutter glasses 22 in FIG. 1 are different from the liquid crystal shutter glasses 2 according to the earlier technology in FIG. 8. The video signal is supplied to the CRT 1 substantially in the same manner as shown in FIG. 9(a) (earlier technology). Moreover, electric signals for transmission and shutoff show substantially the same period as those shown in FIG. 9(b) and FIG. 9(c) (earlier technology).

With this constitution, it is only in the display area of the CRT 1 that the liquid crystal shutter glasses 22 function as a shutter. In other words, the liquid crystal shutter glasses 22 do not function as a shutter for a surround area. The principle of this is specifically described hereinafter referring to FIG. 2 which shows a detailed structure concerning a single eyeball (right eye 100R or left eye 100L) of a viewer 100 in FIG. 1.

Figure 2:
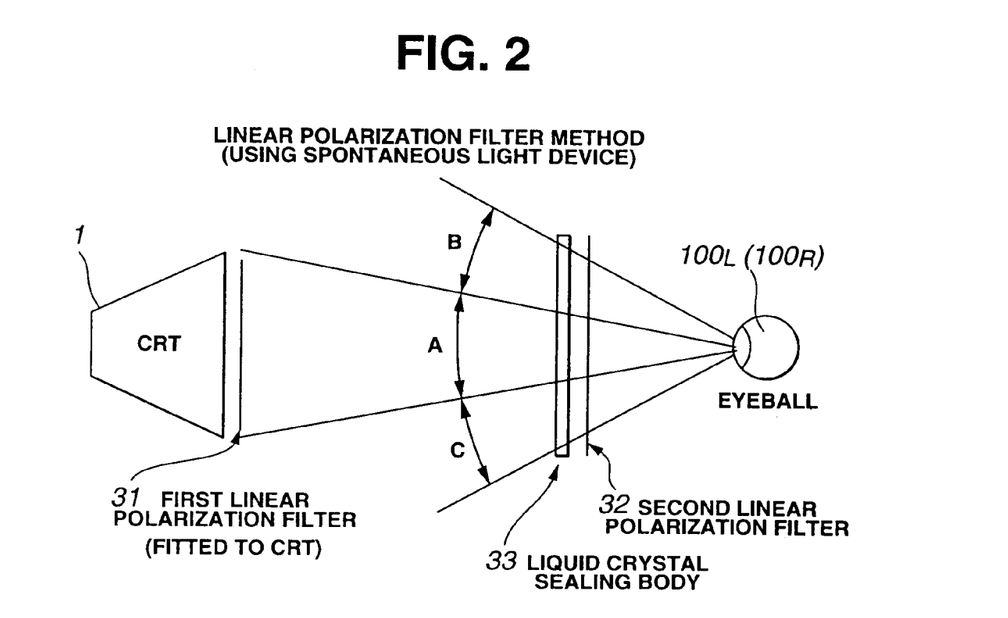
FIG. 2 is a constitution of a linear polarization filter method (using spontaneous light device), according to a first preferred embodiment of the present invention.

As is seen in FIG. 2, there is provided a linear polarization filter method (using spontaneous light device), according to a first preferred embodiment of the present invention. There is provided a first linear polarization filter 31 which is so mounted as to oppose the display surface of the CRT 1. Moreover, there is provided a second linear polarization filter 32 which is so disposed as to oppose the left eye 100L (right eye 100R as well) when a viewer 100 in FIG. 1 wears the liquid crystal shutter glasses 22. Moreover, there is provided a liquid crystal sealing body 33 (glass plate) which is disposed in the vicinity of the second linear polarization filter 32 facing the CRT 1.

The first linear polarization filter 31, the second linear polarization filter 32, and the liquid crystal sealing body 33 constitute a liquid crystal shutter which is a time-sharing picture display shutting means under the present invention.

In an area covered by a viewing angle A corresponding to the display surface of the CRT 1, the liquid crystal shutter acts as a shutter for the left eye 100L (right eye 100R as well) of the viewer 100, to thereby allow the viewer 100 to recognize the display of the CRT 1 as a stereo picture. On the other hand, in an area covered by a viewing angle B and a viewing angle C which are free from shutter function, the viewer 100 can view the surround area naturally without sensing any flicker.

Moreover, it is only the second linear polarization filter 32 that attenuates surround brightness. The second linear polarization filter 32 has transmission of about 50%, causing substantially no harmful effect on daily life.

The present invention is not limited to the linear polarization filter method in FIG. 2.

Figure 3:
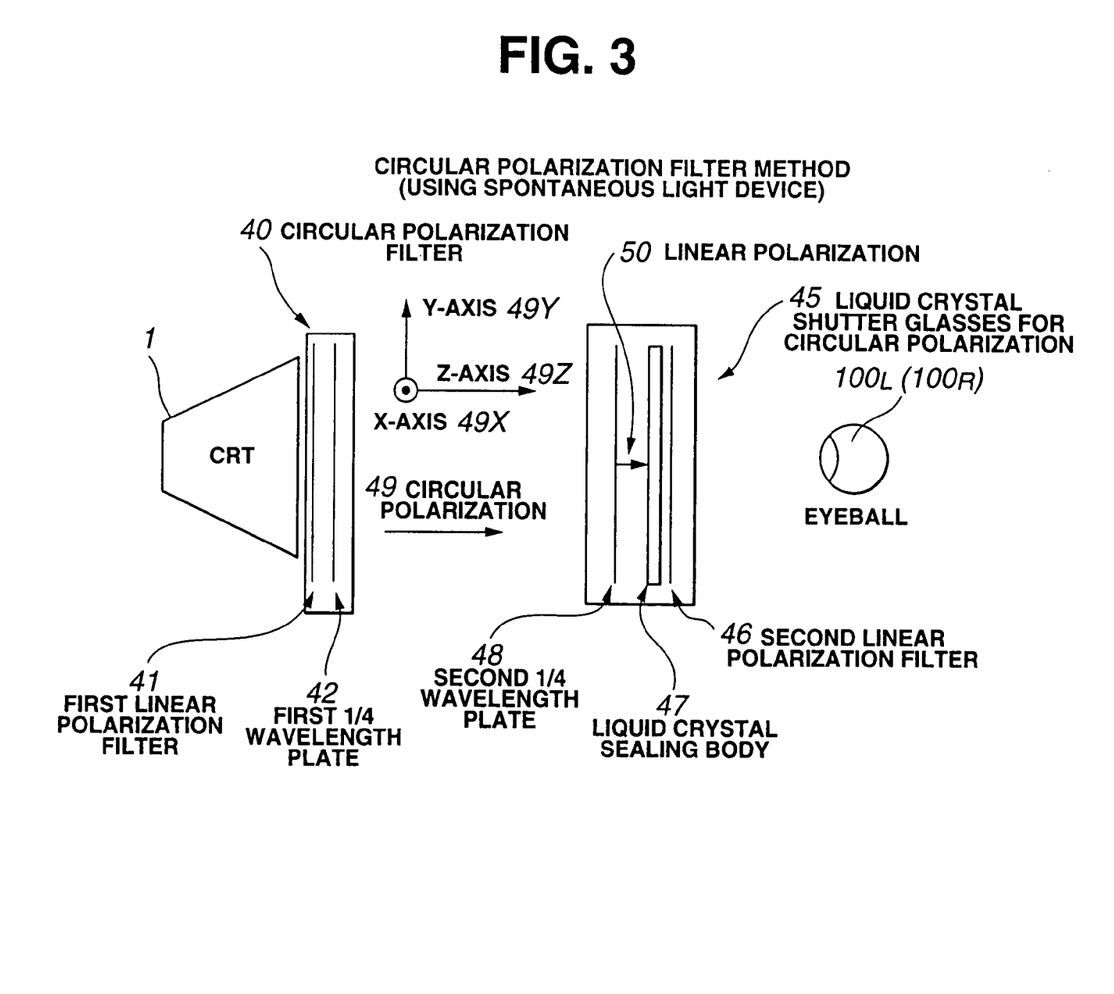
FIG. 3 is a constitution of a circular polarization filter method (using spontaneous light device), according to a second preferred embodiment of the present invention.

As is seen in FIG. 3, there is provided a circular polarization filter method (using spontaneous light device), according to a second preferred embodiment of the present invention. A circular polarization filter 40 is constituted of a first linear polarization filter 41 and a first ¼ wavelength plate 42. The first linear polarization filter 41 is so disposed as to oppose the display surface of the CRT 1. The first ¼ wavelength plate 42 is disposed in the vicinity of the first linear polarization filter 41.

There are also provided a pair of liquid crystal shutter glasses 45 for circular polarization. The liquid crystal shutter glasses 45 are constituted of a second linear polarization filter 46, a liquid crystal sealing body 47 (glass plate), and a second ¼ wavelength plate 48. The second linear polarization filter 46 is so disposed as to oppose the left eye 100L (right eye 100R as well) of the viewer 100. The liquid crystal sealing body 47 is disposed in the vicinity of the second linear polarization filter 46. The second ¼ wavelength plate 48 is disposed in the vicinity of the liquid crystal sealing body 47.

Light of the picture displayed on the display surface of the CRT 1 is polarized into a circular polarization 49 between an area defined by the second ¼ wavelength plate 48 of the liquid crystal shutter glasses 45, and thereafter is polarized into a linear polarization 50 between an area defined by the second ¼ wavelength plate 48 and the liquid crystal sealing body 47.

The circular polarization 49 is defined as follows: Light progressing in a Z-axis 49Z is shifted by ¼ wavelength in an X-axis 49X and also shifted by ¼ wavelength in a Y-axis 49Y different from the X-axis 49X.

Otherwise, the circular polarization 49 is defined as follows: Once the light is circularly polarized, the polarization surface rotates around the Z-axis 49Z. Therefore, the X-axis 49X and the Y-axis 49Y arbitrarily cause ¼ wavelength shift on each of the axes.

When the newly assumed X-axis 49X and Y-axis 49Y coincide with each other on an axis of the second ¼ wavelength plate 48, the light passing through the second ¼ wavelength plate 48 causes a wavelength shift of a multiple of ½ wavelength in the X-axis 49X and the Y-axis 49Y, to thereby cause the linear polarization 50. Thereafter, the liquid crystal sealing body 47 electrically controls rotation of the polarization surface so as to, then, allow the light pass through the second linear polarization filter 46. The above summarizes how light having the circular polarization 49 is controlled when the light passes through the liquid crystal shutter glasses 45.

In the above circular polarization filter method according to the second preferred embodiment in FIG. 3, the viewer 100 can view the surround area without sensing any flicker, as in the linear polarization filter method according to the first preferred embodiment in FIG. 2. In the circular polarization method, the shutter function is not deteriorated even when the viewer 100 wearing the liquid crystal shutter glasses 45 turns his (or her) head.

According to the first preferred embodiment in FIG. 2 and the second preferred embodiment in FIG. 3, it is the CRT 1 (spontaneous light device) that is used for the display device. The present invention is, however, not limited to this. An optical modulation device can be used under the present invention.

Figure 4:
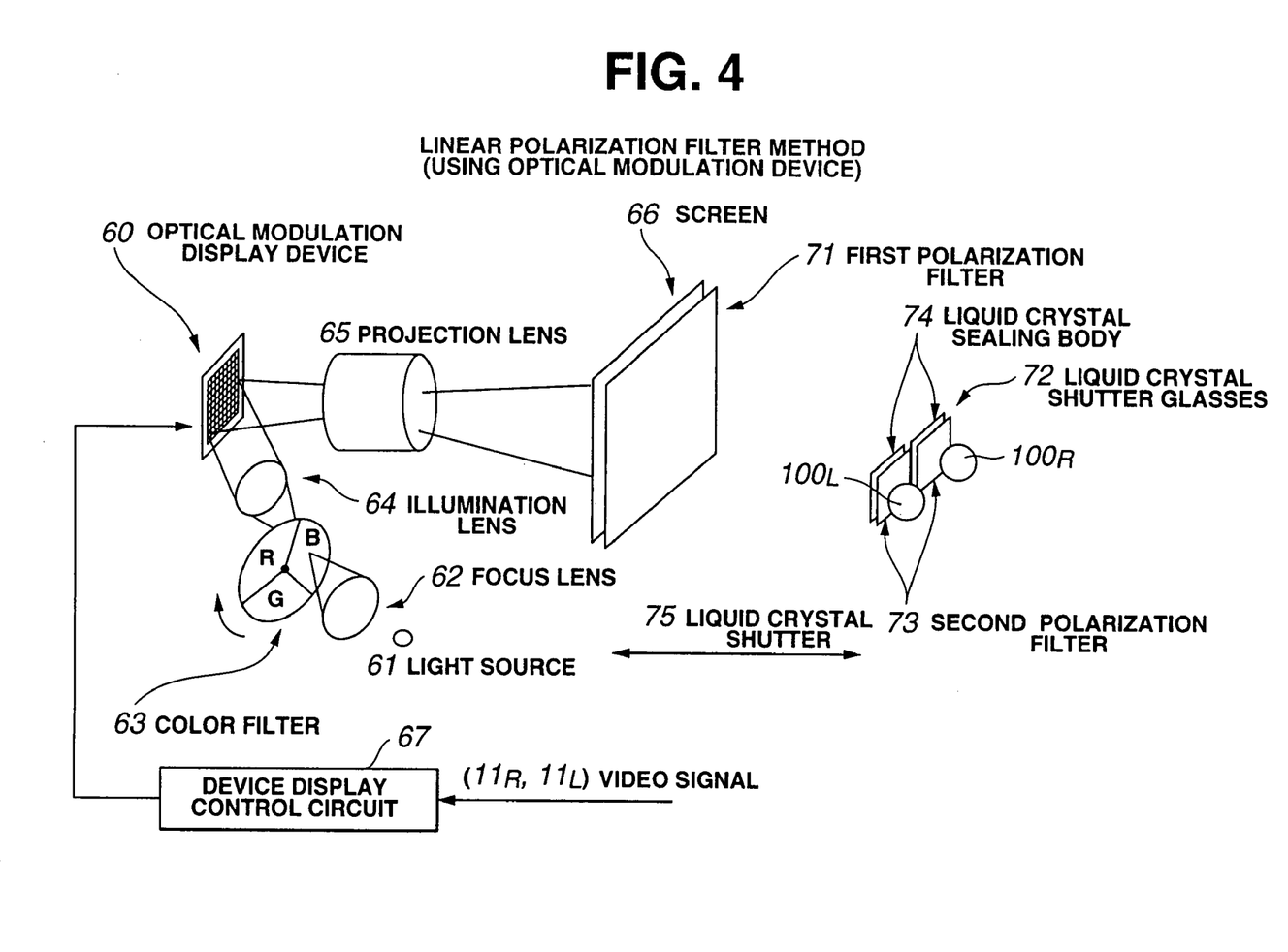
FIG. 4 is a constitution of a linear polarization filter method (using optical modulation device), according to a third preferred embodiment of the present invention.
Figure 5:
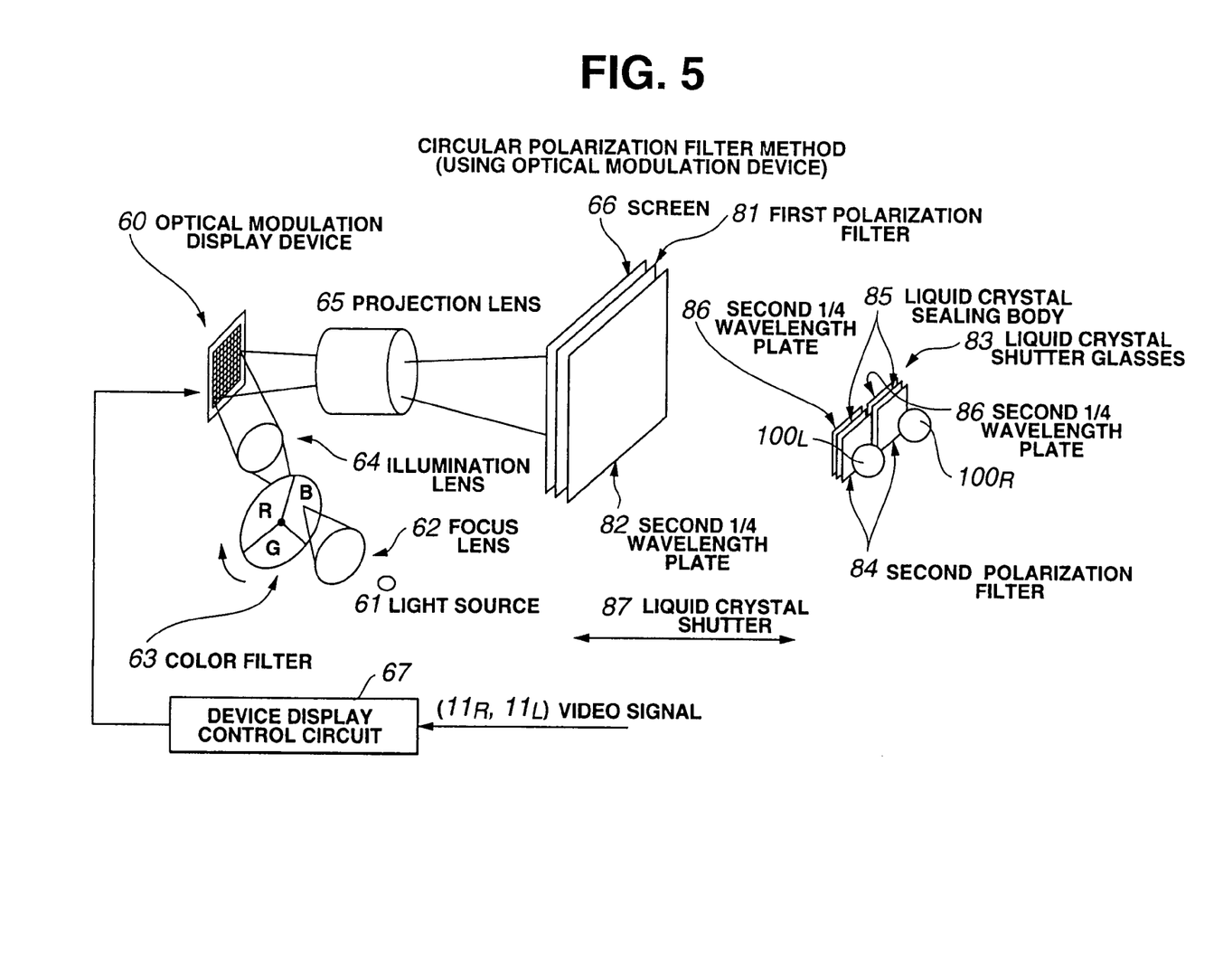
FIG. 5 is a constitution of a circular polarization filter method (using optical modulation device), according to a fourth preferred embodiment of the present invention.

As is seen in FIG. 4 and FIG. 5, there is provided an optical modulation display device 60. The optical modulation display device 60 has a display surface to which a light from a light source 61 is projected by way of a focus lens 62, a color filter 63 (not applicable for a monochrome display), and an illumination lens 64.

The light reflected from the optical modulation display device 60 is projected, by way of a projection lens 65, to a screen 66, to thereby display the picture. There is also provided a device display control circuit 67 in FIG. 4 and FIG. 5.

As is seen in FIG. 4, there is provided a linear polarization filter method (using an optical modulation device), according to a third preferred embodiment of the present invention. There is provided a first polarization filter 71 on a second surface (of the screen 66) opposite to a first surface (of the screen 66) which faces the optical modulation display device 60 as a projection surface. Moreover, for shutting off linear polarization, there are provided a pair of liquid crystal shutter glasses 72 which have a second polarization filter 73, and a liquid crystal sealing body 74 (glass plate). The second polarization filter 73 is so disposed as to oppose one of the right eye 100R and the left eye 100L when the viewer 100 wears the liquid crystal shutter glasses 72. The liquid crystal sealing body 74 is disposed in the vicinity of the second polarization filter 73.

The first polarization filter 71, the second polarization filter 73, and the liquid crystal sealing body 74 constitute a liquid crystal shutter 75.

Herein, the liquid crystal shutter 75 operates substantially in the same manner as the liquid crystal shutter (which is constituted of the first linear polarization filter 31, the second linear polarization filter 32, and the liquid crystal sealing body 33) in FIG. 2, according to the first preferred embodiment.

As is seen in FIG. 5, there is provided a circular polarization filter method (using the optical modulation device), according to a fourth preferred embodiment of the present invention. There is provided a first polarization filter 81 on the second surface (of the screen 66) opposite to the first surface (of the screen 66) which faces the optical modulation display device 60 as the projection surface. The first polarization filter 81 has a first ¼ wavelength plate 82. Moreover, for shutting off circular polarization, there are provided a pair of liquid crystal shutter glasses 83 which have a second polarization filter 84, a liquid crystal sealing body 85 (glass plate), and a second ¼ wavelength plate 86. The second polarization filter 84 is so disposed as to oppose one of the right eye 100R and the left eye 100L when the viewer 100 wears the liquid crystal shutter glasses 83. The liquid crystal sealing body 85 is disposed in the vicinity of the second polarization filter 84. The second ¼ wavelength plate 86 is disposed in the vicinity of the liquid crystal sealing body 85.

The first polarization filter 81, the second polarization filter 84, the first ¼ wavelength plate 82, the second ¼ wavelength plate 86, and the liquid crystal sealing body 85 constitute a liquid crystal shutter 87.

Herein, the liquid crystal shutter 87 operates substantially in the same manner as the liquid crystal shutter (liquid crystal shutter glasses 45) in FIG. 3, according to the second preferred embodiment.

Figure 6:
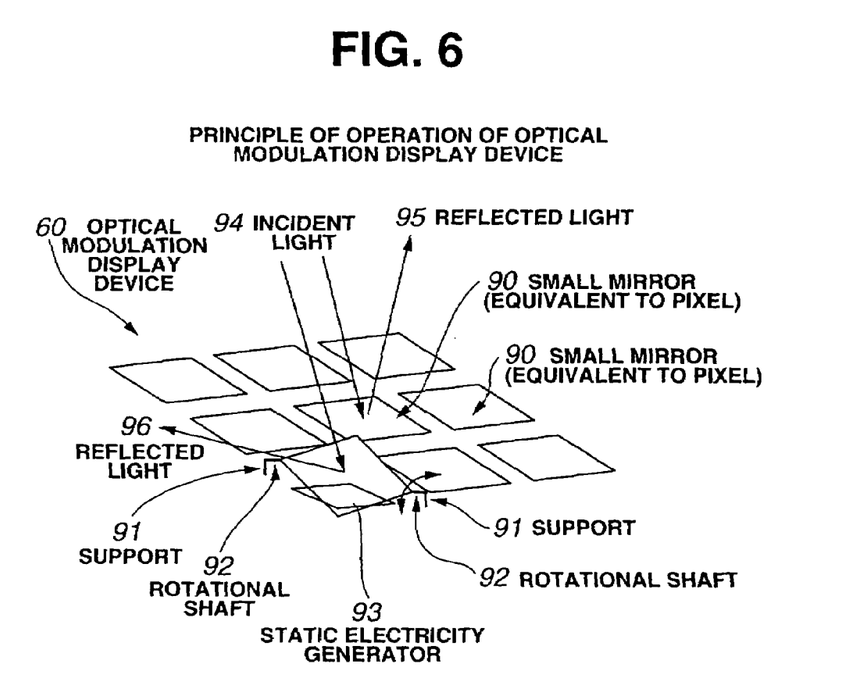
FIG. 6 shows a principle of display by means of an optical modulation display device 60.

As is seen in FIG. 6, there is provided an enlarged display surface of the optical modulation display device 60 which is an aggregate of small mirrors 90. Each of the small mirrors 90 is equivalent to a pixel. The small mirror 90 is held with a rotational shaft 92 which is supported by a support 91. The small mirror 90 is rotatably controlled around the rotational shaft 92 by means of a static electricity generator 93 which is disposed below the small mirror 90.

As is seen in FIG. 6, an incident light 94 from one direction causes one of a reflected light 95, a reflected light 96 and the like having different directions from each other, depending on how the individual small mirror 90 is inclined. More specifically for example, when an optical system is so designed that the reflected light 95 is focused on the projection lens 65 in FIG. 4 and FIG. 5, the small mirror 90 that reflects the reflected light 95 is displayed on the screen 66 as a lighted-up pixel (ON). Controlling period of the thus lighted-up pixel brings about a monochrome gradation display.

Moreover, as is seen in FIG. 4 and FIG. 5, the color filter 63 is rotatably disposed between the focus lens 62 and the illumination lens 64. Displaying the picture synchronously with the rotation of the color filter 63 brings about a color display by the field sequential method.

A right video signal 11R for the right eye 100R and a left video signal 11L for the left eye 100L are inputted into the device display control circuit 67 in FIG. 4 and FIG. 5 at the video signal period in FIG. 9(*a*). Moreover, the liquid crystal shutter 75 for the left eye 100L and the liquid crystal shutter 87 for the left eye 100L are switched to transmission at the period in FIG. 9(*b*), while the liquid crystal shutter 75 for the right eye 100R and the liquid crystal shutter 87 for the right eye 100R are switched to transmission at the period in FIG. 9(*c*).

Within an area covered by the viewing angle corresponding to the display surface of the screen 66, each of the liquid crystal shutter 75 (FIG. 4) and the liquid crystal shutter 87 (FIG. 5) acts as a shutter for the right eye 100R and the left eye 100L, to thereby allow the viewer 100 to recognize the display of the screen 66 as a stereo picture. On the other hand, in an area covered out of the viewing angle corresponding to the display surface of the screen 66, each of the liquid crystal shutter 75 and the liquid crystal shutter 87 does not act as a shutter, to thereby allow the viewer 100 to view the surround area naturally without sensing any flicker.

It is only the second polarization filter 73 in FIG. 4 and the second polarization filter 84 in FIG. 5 that attenuate surround brightness. Therefore, substantially no harmful effect is caused on daily life.

According to the preferred embodiments above, the liquid crystal shutting means is fitted to the head portion of the viewer 100 as liquid crystal shutter glasses. Of the time-sharing picture display shutting means, the first polarization filter is fitted to the display surface of the display device. The present invention is, however, not limited to this.

Figure 7:
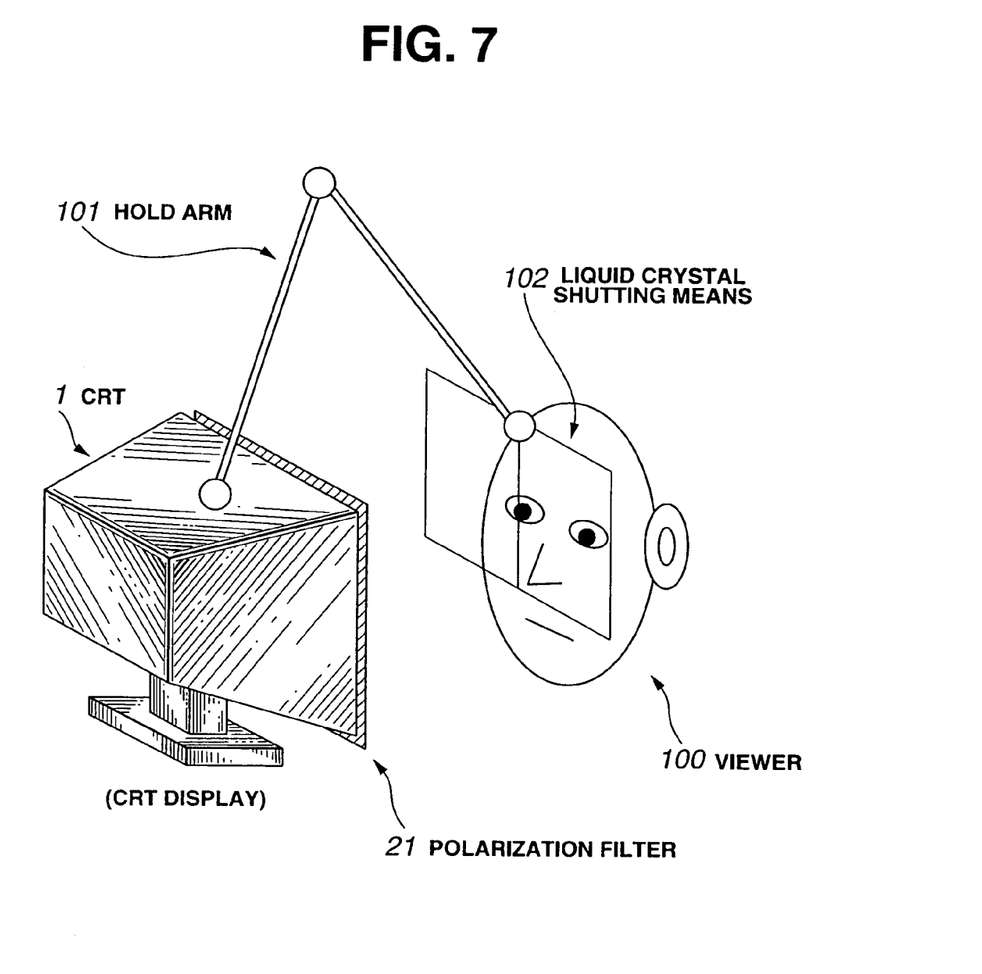
FIG. 7 is a perspective view of a liquid crystal shutting means supported to a CRT, according to a fifth preferred embodiment of the present invention.

More specifically, as is seen in FIG. 7, there is provided a liquid crystal shutting means 102 which is mounted on a head end of a hold arm 101 disposed on an upper surface of the CRT 1, according to a fifth preferred embodiment of the present invention.

In FIG. 7, the liquid crystal shutting means 102 of the linear polarization filter method is constituted, for example, of the second linear polarization filter 32 and the liquid crystal sealing body 33 in FIG. 2, while the liquid crystal shutting means 102 of the circular polarization filter method is constituted, for example, of the second linear polarization filter 46, the liquid crystal sealing body 47, and the second ¼ wavelength plate 48 in FIG. 3.

Allowing one of a support portion (supported to CRT 1), a bent portion and a head portion of the hold arm 101 to be movable enables the viewer 100 to view the display screen of the CRT 1 with the liquid crystal shutting means 102 disposed in a predetermined position.

Like in FIG. 2, FIG. 3 (FIG. 4, and FIG. 5 as well though not showing CRT 1), the liquid crystal shutting means 102 in FIG. 7 acts only on the display surface of the CRT 1.

The liquid crystal shutting means 102 in FIG. 7 is not fitted to the head of the viewer 100, to thereby relieve the viewer 100 from feeling annoyance.

In the case of using the optical modulation display device (such as those shown in FIG. 4 and FIG. 5), the liquid crystal shutting means 102 is to be held with a hold means (substantially the same as the hold arm 101 in FIG. 7) which is disposed on a seat opposing a screen of the optical modulation display device.

The means for holding the liquid crystal shutting means 102 is not limited to the hold arm 101. More specifically, the means for holding the liquid crystal means 12 can be disposed at a position other than the head of the viewer 100.

The entire contents of Japanese Patent Application No. 2001-166033 with a filing date of Jun. 1, 2001 is herein incorporated by reference.

Although the invention has been described above by reference to certain embodiments of the invention, the invention is not limited to the embodiments described above. Modifications and variations of the embodiments described above will occur to those skilled in the art in light of the above teachings.

The scope of the invention is defined with reference to the following claims.

What is claimed is:

1. A stereoscopic picture image forming system for forming a picture image of an object separated into a first sub-object for a left eye and a second sub-object for a right eye, the stereoscopic picture image forming system comprising:
    a display device for displaying the picture image of the object;
    a first linear polarization filter and a first quarter-wavelength plate disposed at a display surface of the display device;
    a common image-forming means;
    a first image pick-up means for picking up the displayed picture image for the left eye, the picture image being introduced by way of the common image-forming means;
    a second image pick-up means for picking up the displayed picture image for the right eye, the picture image being introduced by way of the common image-forming means;
    a liquid crystal sealing body associated with the first and second image pick-up means having separate shutters associated with each of said first and second image pick-up means; and
    a second linear polarization filter disposed at one of a front and a rear surface of each of said image pick-up means,
    a second ciuarter-wavelength plate disposed at the front surface of each of said image pick-up means, wherein the separate shutters have a function of shutting off an area covered by a viewing angle which corresponds to a display area of the display device.

2. The stereoscopic picture image forming system as claimed in claim 1, in which the stereoscopic picture image forming system further comprises an optical means for separating the picture image of the object into the first sub-object for the left eye and the second sub-object for the right eye, and in which each of the first image pick-up means and the second image pick-up means is disposed at an image formation position of the common image-forming means.

3. The stereoscopic picture image forming system as claimed in claim 1, in which the common image-forming means has a zoom function.

4. The stereoscopic picture image forming system as claimed in claim 3, in which the common image-forming means is a lens.

5. The stereoscopic picture image forming system as claimed in claim 2, in which the common image-forming means has a zoom function.

6. The stereoscopic picture image forming system as claimed in claim 5, in which the common image-forming means is a lens.

7. The stereoscopic picture image forming system as claimed in claim 1, in which each of the first image pick-up means and the second image pick-up means comprises a charge coupled device.

8. The stereoscopic picture image forming system as claimed in claim 1, in which each of the first image pick-up means and the second image pick-up means comprises a complementary metal oxide semiconductor.

9. The stereoscopic picture image forming system as claimed in claim 2, in which the optical means comprises a mirror.

10. The stereoscopic picture image forming system as claimed in claim 9, in which the mirror of the optical means comprises:
    a pair of a first left mirror and a first right mirror disposed on an external peripheral side of the common image-forming means in such a manner as to oppose to each other, each of the first left mirror and the first right mirror forming a predetermined angle with respect to the common image-forming means; and
    a pair of a second left mirror and a second right mirror disposed, respectively, substantially in parallel with the first left mirror and the first right mirror, and disposed in such a position as to oppose to the common image-forming means.

11. The stereoscopic picture image forming system as claimed in claim 2, in which the optical means comprises a prism.

12. The stereoscopic picture image forming system as claimed in claim 2, further comprising a pair of a third left mirror and a third right mirror disposed in such a manner as to form a predetermined angle therebetween, the third left mirror being so disposed relative to the first image pick-up means as to allow the picture image for the left eye introduced by way of the common image-forming means to reach the first image pick-up means at the image formation position of the common image-forming means, and the third right mirror being so disposed relative to the second image pick-up means as to allow the picture image for the right eye introduced by way of the common image-forming means to reach the second image pick-up means at the image formation position of the common image-forming means.

13. A stereoscopic image system comprising:

a display via which a stereoscopic image is displayed;

a first linear polarization filter and a first quarter-wavelength plate disposed at a display surface of the display device;

a liquid crystal sealing body associated with first and second image pick-up means having separate shutters associated with each of said first and second image pick-up means;

a second linear polarization filter disposed at one of a front and a rear surface of each of said image pick-up means, a second quarter-wavelength plate disposed at the front surface of each of said image pick-up means, wherein the separate shutters have a function of shutting off an area covered by a viewing angle which corresponds to a display area of the display device.

* * * * *